Patented Nov. 20, 1928.

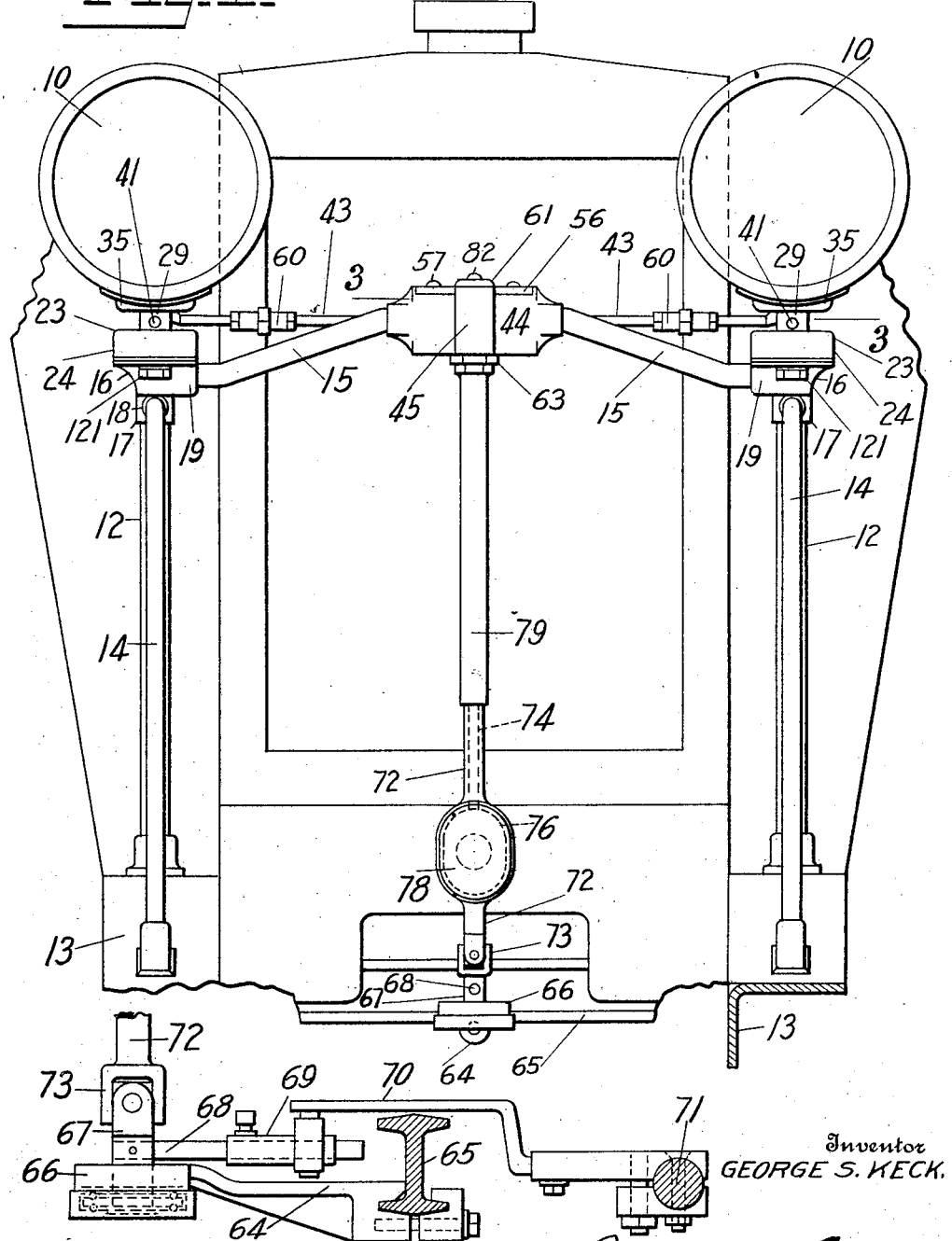

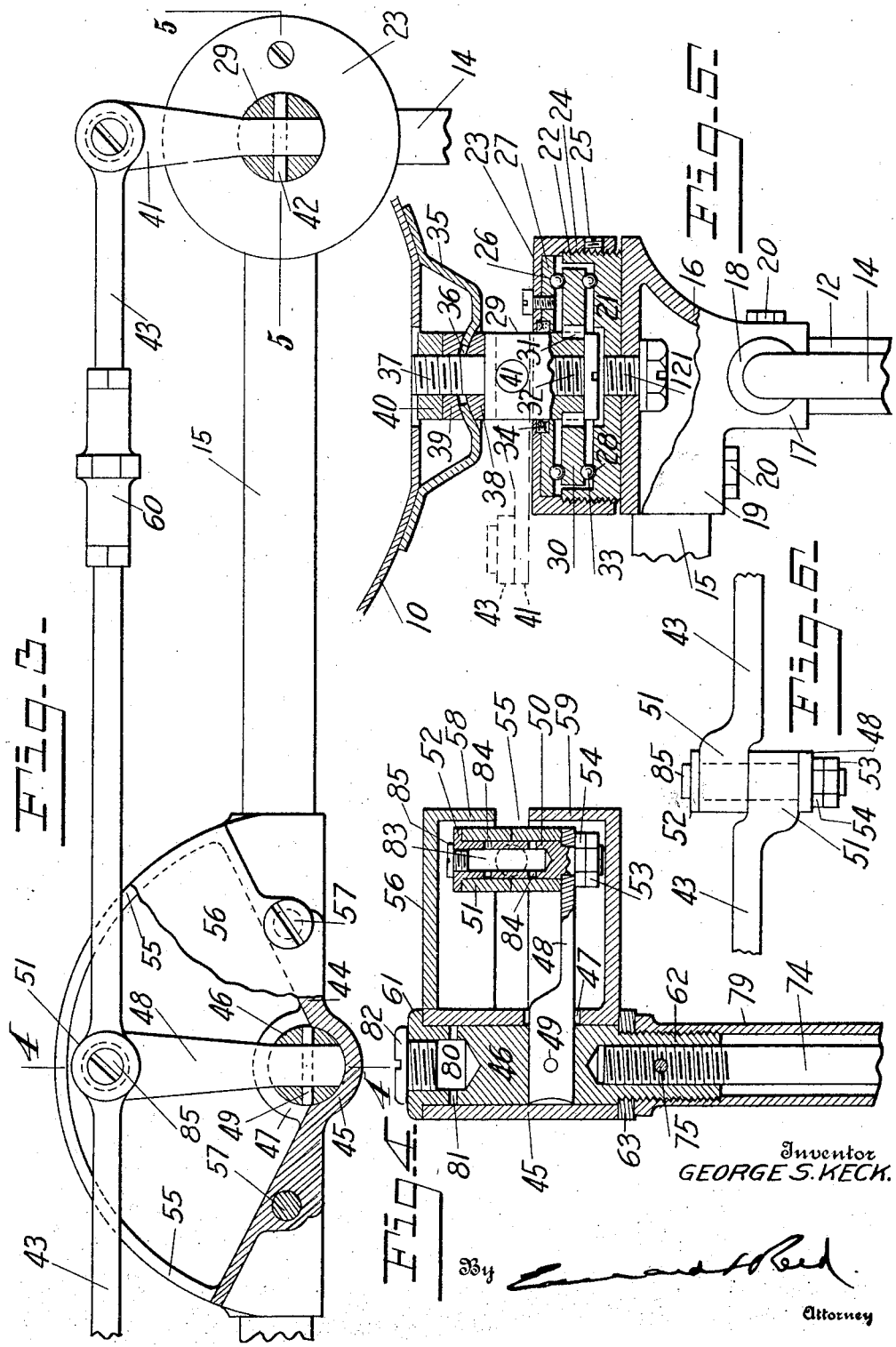

1,692,172

UNITED STATES PATENT OFFICE.

GEORGE S. KECK, OF PASADENA, CALIFORNIA, ASSIGNOR TO THE INTERNATIONAL CONTROLLED LAMP COMPANY, OF WILMINGTON, DELAWARE, A CORPORATION OF DELAWARE.

DIRIGIBLE HEADLIGHT FOR AUTOMOBILES AND THE LIKE.

Application filed March 8, 1926. Serial No. 93,122.

This invention relates to dirigible headlights for automobiles and the like.

One object of the invention is to provide a dirigible headlight mechanism in which the headlights will be mounted on the main frame of the automobile in such a manner that they will be subjected to much less vibration than when mounted on the fenders or other parts of the automobile, thereby materially reducing the liability of the lamps being thrown out of adjustment so that the rays of light will be misdirected.

A further object of the invention is to provide controlling mechanism for dirigible headlights in which the operating devices for the lamps will be located in an intermediate position between the headlights.

A further object of the invention is to provide operating mechanism for dirigible headlights of such a character that it may be enclosed in a protecting housing.

A further object of the invention is to provide supporting and operating devices for dirigible headlights of such a character that they may be easily accomodated to automobiles of different sizes and proportions.

A further object of the invention is to provide operating mechanism for dirigible headlights which will be simple in construction and of a strong durable character.

Other objects of the invention will appear as the mechanism is described in detail.

In the accompanying drawings Fig. 1 is a front elevation of an automobile, partly broken away, showing my invention applied thereto; Fig. 2 is a side elevation of the actuating mechanism which is connected with the steering devices; Fig. 3 is a sectional view taken on the line 3—3 of Fig. 1 with the housing for the operating device partly broken away; Fig. 4 is a vertical sectional view taken on the line 4—4 of Fig. 3; Fig. 5 is a sectional view taken on the line 5—5 of Fig. 3; and Fig. 6 is a detail view of the connection between the operating arm and the connecting rods.

In these drawings I have illustrated one embodiment of my invention but it will be understood that I have chosen this particular embodiment for the purpose of illustration only and that the mechanism may take various forms and may be arranged in various ways without departing from the spirit of the invention.

In that embodiment of the invention here illustrated the headlights 10 are shown as of a conventional design and are carried by supporting structures mounted on the respective side members of the main frame of the automobile. Preferably each supporting structure comprises an upright standard 12 rigidly secured at its lower end to one of the side members 13 of the main frame of the automobile. A brace 14 is connected at its upper end with the standard, extends downwardly and forwardly therefrom and is rigidly secured at its lower end to the frame member so as to rigidly brace the standard against fore and aft vibration. The standards 12 for the two lamps are braced one against the other by means of a brace 15 extending transversely to the automobile and rigidly secured at its ends to the respective standards. The several parts of this supporting structure may be connected one to the other in any suitable manner but, in the present device, I have mounted on the upper end of each standard 12 a bracket 16 which is preferably in the form of a casting having a socket 17 to receive the upper end of the standard and having a forwardly extending socket 18 to receive the upper end of the brace 14. This bracket also has laterally extending socket 19 to receive the adjacent end of the brace bar 15. The several parts may be secured in the sockets in any suitable manner but I prefer to use set screws 20 for this purpose. The bracket or casting 16 serves not only as a connecting member for the several parts of the standard but also serves to support the headlight. This headlight is mounted for movement about a substantially vertical axis. To this end I have mounted on the bracket 16 a bearing in which is journaled a part rigidly connected with the headlight. As here shown, the upper face of the bracket is flat and I have mounted on this flat surface of the bracket a bottom plate 21 of the bearing, this bottom plate being secured to the bracket by a screw 121. The peripheral edge of the bottom plate is provided with screw threads and preferably the plate has an upwardly extending circumferential flange 22 to provide a relatively large threaded surface. The top plate 23 of the bearing has a dependent flange 24 which is threaded onto the bottom plate 21 and may be secured in adjusted positions thereon by a set screw 25. The top plate of the bearing is provided with a ball race 26 which, in the present instance, is formed in a wear plate 27 which bears against and in effect forms a part of the top plate. The bottom plate 21 is also provided with a ball race, as shown at 28. The top plate, comprising the parts 23 and 27, has a central opening in which is journaled a stud or trunnion 29 the lower end of which projects into the bearing housing and has rigidly secured to its inner end a bearing plate 30. As here shown, the lower end of the stud or trunnion has a driving fit in the central opening in the bearing plate 30. Keys 31 serve to hold the plate and trunnion against relative rotation and if desired a screw 32 may be inserted in the lower end of the trunnion with its head overlapping the edge of the bearing plate 30 to clamp this plate tightly against the shoulder formed by the reduced portion of the trunnion. The bearing plate is provided in its upper and lower surfaces with ball races opposed to the ball races 26 and 28, and bearing balls 33 are mounted in these ball races so that the plate and trunnion are supported in the bearing for free rotary movement. A packing 34 of felt or the like is inserted in a recess formed in the two parts of the top plate and bears against the trunnion 29 to prevent the escape of grease and the entrance of dust. The upper end of the trunnion 29 is rigidly secured to the lamp 10 and in the form here illustrated I have rigidly secured to the lamp casing, by brazing or otherwise, a connecting member or bracket 35 having an opening 36 to receive the upper end of the trunnion 29. Preferably the upper end of the trunnion is reduced in diameter, as shown at 37, and a washer 38 is supported on a shoulder at the lower end of the reduced portion thereof, this washer having a convex upper surface and the lower surface of the connecting member 35 being concave to fit snugly about the upper surface of the washer. A second washer 39 having a concave lower surface rests upon the upper surface of the connecting member 35, and a nut 40 threaded onto the reduced portion 37 of the trunnion above the washer 39 serves to clamp the connecting member firmly between the two washers and to hold the lamp rigidly in position. The opening 36 in the connecting member is preferably somewhat larger than the portion 37 of the trunnion so that the lamp can be adjusted or tilted with relation to this trunnion, if desired, and then rigidly secured in its adjusted position by tightening down the nut 30.

Rigidly connected with the trunnion of each headlight is an arm 41 which, in the present instance, extends into a transverse bore in the trunnion and is rigidly secured therein by a pin 42. This arm extends rearwardly from the trunnion and is pivotally connected at its rear end with a connecting rod 43, by means of which the headlight is connected with an operating device mounted between the two headlights. In the present construction, the operating device is carried by the transverse brace 15 and to this end this brace is formed in two parts, the adjacent ends of which are rigidly secured to a housing 44, this housing preferably having sockets at the respective ends thereof to receive the ends of the two parts of the brace bar 15. This housing carries a vertical bearing 45, which is preferably formed integral therewith and in which is journaled a trunnion 46. The trunnion has at its upper end a circumferential flange 61 which overlies the upper end of the bearing 45, and has its lower end reduced in diameter, as shown at 62, and extending below the housing. A nut 63 is threaded on this reduced portion of the trunnion to retain the same in proper position within the bearing. The upper end of the trunnion is provided with an oil receptacle 80 which communicates with the bearing surfaces through ports 81 and is closed by a cap 82. Rigidly secured to this trunnion, and projecting through a circumferential slot 47 in the wall of the bearing, is an operating arm 48 which is preferably mounted in a transverse bore in the trunnion and secured therein by a pin 49. At its outer or rear end this arm has pivotal connection with the connecting rods 43 for the two headlights. These connections may take any suitable form but, as here shown, a stud or trunnion 50 is mounted on the outer end of the arm and the connecting rods 43 are provided at their adjacent ends with bearings 51 which are mounted one above the other on the stud 50. The stud has at its upper end a circumferential flange 52 which overlies the upper bearing 51, and the lower end of the stud is reduced in diameter, extends through an opening in the end of the arm 48 and is provided with a nut 53 and lock washer 54. The stud 50 is also provided with a longitudinal bore constituting an oil receptacle 83 which communicates through suitable ports 84 with the bearing surfaces and is closed by a cap 85. The connecting rods 43 project through a slot 55 formed in the curved rear wall of the housing, which is of such a length as to permit of the free movement of the connecting rods when the operating arm is moved from one limit of its movement to the other. For convenience of manufacture and assembly the housing 44 is preferably formed in two parts and, as here shown, the top wall or plate 56 is formed separate from the body of the housing and the forward portion thereof is supported on the upper edge of the body of the housing, to which it is secured by screws 57. The rear edge of the top plate 56 has a depending flange 58, the lower edge of which is spaced from the upper edge of a flange 59 on the body of the housing to provide the slot 55. It will be apparent therefore that when the trunnion 46 is moved about its axis this movement will be transmitted through the arm 48 and connecting rods 43 to the two headlights and these headlights will be moved simultaneously in the same direction and to the same extent. Preferably each connecting rod 43 is adjustable and to this end they are here shown as provided with turnbuckles 60.

Operative movement is imparted to the trunnion 46 of the operating device through suitable connections with the steering mechanism so that the headlights will be adjusted according to the direction in which the automobile is turning. These connections may be of any suitable character and, in the present instance, they are of substantially the same construction and operation as those shown in the application for patent filed by me on the 5th day of February, 1926, Serial No. 86,117. Inasmuch as these connecting and actuating devices which are interposed between the operating mechanism and the steering mechanism form no part of the present invention it is not necessary that they should be shown or described in detail. As shown in Figs. 1 and 2 a bracket 64 is rigidly secured to the front axle 65 of the automobile, extends forwardly therefrom and is provided at its forward end with a bearing 66 in which is rotatably mounted a stud 67. Rigidly secured to this stud and extending rearwardly therefrom is an arm or lever 68 on which is slidably mounted a sleeve 69. An actuating arm 70 is pivotally connected at its forward end with the sleeve 69, extends rearwardly across the axle 65 and is rigidly secured at its rear end to the drag bar 71 of the steering mechanism of the automobile, so that any movement imparted to this drag bar will be transmitted to the stud and this stud rotated about its vertical axis. A tubular connecting member 72 is connected at its lower end with the stud 67, preferably by a universal joint 73, and slidably mounted in this tubular member is a rod 74, the upper end of which is rigidly connected with the trunnion 46 of the operating device. In the present instance, the rod is screw threaded into the lower portion of the trunnion and secured therein by a pin 75. The parts 72 and 74 of the connecting device are held against rotation relatively one to the other and consequently the rotatory movement imparted to the actuating stud 67 will be transmitted to the trunnion 46 and to the headlights. This connecting device being arranged centrally of the automobile will extend in front of the shaft to which the crank is applied to start the engine. To avoid interfering with the application of the crank to this shaft the tubular member 72 is provided with an opening 76 through which the crank may be inserted. Preferably this opening is elongated to accommodate it to different automobiles and, if desired, a cover plate 78 may be pivotally mounted on the connecting member to close the opening and prevent the entrance of dust into the tubular member. To prevent the entrance of dirt into the upper end of the tubular member I have mounted about the same a tubular guard 79 the upper end of which is screw threaded onto the threaded lower end of the trunnion 46 and when screwed up against the nut 63 serves as a lock nut therefor.

The operation of the mechanism will be readily understood from the foregoing description and it will be apparent that not only are the supporting devices and the operating mechanism of a very simple durable construction and mounted in such a way as to reduce vibration to a minimum, but that these parts are of such a character that the mechanism as a whole may be easily mounted on automobiles of different sizes and different dimensions by merely varying the length of the various parts of the mechanism. If these parts are furnished of a maximum length they can be easily cut to the length required for any particular installation. Further, it will be apparent that the supporting and operating mechanism may be used in connection with a single headlight. When so used the headlight may be mounted in any suitable position on the supporting structure and the only change necessary in the operating mechanism would be in the connecting means between the headlight and the actuating device.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a dirigible headlight mechanism, supporting members having means for mounting the same near the respective sides of an automobile frame, a housing rigidly mounted between said supporting members, having a vertical bearing at one side thereof and having a horizontal slot in one wall thereof, a trunnion journaled in said bearing, means for operatively connecting said trunnion with the steering mechanism of an automobile, an actuating member connected with said trunnion and arranged within said housing, a headlight mounted for movement about a vertical axis, and means extending through slot in said housing for operatively connecting said actuating member with said headlight.

2. In a mechanism of the character described, the combination with headlights mounted in spaced relation one to the other, one of said headlights being movable on a vertical axis and an arm rigidly secured to said movable headlight, of a housing mounted in a fixed position between said headlights, comprising a vertical bearing and having a horizontal slot in the side wall thereof, a trunnion journaled in said bearing, an arm rigidly secured to said trunnion, a rod connected with said arm within said housing, extending through said slot and connected with the arm of said movable headlight, and means for operatively connecting said trunnion with the steering mechanism of an automobile.

3. In a mechanism of the character described, the combination with headlights mounted in spaced relation one to the other, one of said headlights being movable on a vertical axis, and an arm rigidly secured to said movable headlight, of a housing mounted in a fixed position between said headlights, comprising a vertical bearing and having a horizontal slot in the side wall thereof, a trunnion journaled in said bearing, an arm rigidly secured to said trunnion, a stud carried by said arm near the outer end thereof, a rod having a bearing mounted on said stud, said rod extending through said slot and being connected at its outer end with the arm of the movable headlight, and means for operatively connecting said trunnion with the steering mechanism of an automobile.

4. In a mechanism of the character described, the combination with headlights mounted in spaced relation one to the other, one of said headlights being movable on a vertical axis, and an arm rigidly secured to said movable headlight, of a housing mounted in a fixed position between said headlights and having a vertical bearing extending entirely through the same, said housing having a horizontal slot through the side wall thereof, a trunnion journaled in said bearing and having at its upper end a flange overhanging the top of said housing, a nut threaded on the lower portion of said trunnion to retain the same in said bearing, an arm rigidly secured to said trunnion for oscillating movement in said housing, a rod pivotally connected with said arm near the outer end thereof, extending through said slot and connected at its outer end with the arm of said movable headlight, and means for operatively connecting said trunnion with the steering mechanism of an automobile.

5. In a mechanism of the character described, supporting structures, headlights mounted on said supporting structures, one of said headlights being movable about a vertical axis, a brace bar connected at its ends with the respective supporting structures, a housing interposed in said brace bar between the ends thereof, said housing having a vertical bearing and having a slot through the wall thereof, a trunnion journaled in said bearing, an arm rigidly secured to said trunnion, a rod pivotally connected with said arm near the outer end thereof, extending through said slot and connected at its outer end with the arm of said movable headlight, and means for operatively connecting said trunnion with the steering mechanism of an automobile.

6. In a mechanism of the character described, supporting structures, headlights mounted on the respective structures, one of said headlights being movable about a vertical axis, a brace extending between said supporting structures, a housing comprising a body portion rigidly secured to said brace and having a vertical bearing, said body portion having an upwardly extending flange at the rear edge thereof, remote from said bearing and a removable top plate for said housing having a depending flange arranged above but spaced from the first mentioned flange, a trunnion journaled in said bearing, an arm rigidly secured to said trunnion, a rod pivotally connected with said arm, extending outwardly between the edges of said flanges and connected with the movable headlight, and means for connecting said trunnion with the steering mechanism of an automobile.

7. In a mechanism of the character described, a supporting structure, a bearing comprising a bottom plate rigidly secured to said supporting structure, a top plate spaced from but rigidly connected with said bottom plate and having an opening therethrough, a stud rotatably mounted in said opening, a bearing plate rigidly secured to said stud and arranged between said top plate and bottom plate of said bearing, balls interposed between said bearing plate and said top and bottom plates, a headlight comprising a casing and a bracket rigidly secured to said casing and having an opening therethrough to receive said stud, and means for rigidly securing said bracket on said stud.

8. In a mechanism of the character described, a supporting structure, a bearing comprising a bottom plate rigidly secured to said supporting structure, a top plate spaced from but rigidly connected with said bottom plate and having an opening therethrough, a stud rotatably mounted in said opening, a bearing plate rigidly secured to said stud and arranged between said top and bottom plates of said bearing, balls interposed between said bearing plate and said top and bottom plates, a headlight comprising a casing and a bracket rigidly secured to said casing and having an opening therethrough to receive said stud, said bracket having a concave lower surface, a washer mounted about said stud and having a convex upper surface to engage said bracket, a second washer mounted about said stud and having a concave lower surface to engage the upper surface of said bracket, and a nut threaded onto said stud to clamp said bracket between said washers.

9. In a mechanism of the character described, an upright standard, a bracket rigidly secured to the upper end of said standard and having a flat upper surface, a bearing plate rigidly secured to said bracket and having a circumferential flange, a top plate having a depending flange screw threaded onto the first mentioned flange, said top plate having an opening therethrough, a stud extending through said opening, a bearing plate rigidly secured to the inner end of said stud and arranged between the top and bottom plates of said bearing, balls interposed between said bearing plate and said top and bottom plates, a headlight comprising a connecting member having an opening therethrough to receive the outer portion of said stud, and means for rigidly securing said connecting member to said stud.

In testimony whereof, I affix my signature hereto.

GEORGE S. KECK.